Dec. 25, 1951 L. J. VIDAL 2,580,141

PORTABLE BOOK-RECORD HOLDER

Filed Sept. 30, 1949 2 SHEETS—SHEET 1

INVENTOR,
Leonardo Jose Vidal
BY Ivan P. Tashof
ATTORNEY

Dec. 25, 1951 L. J. VIDAL 2,580,141

PORTABLE BOOK-RECORD HOLDER

Filed Sept. 30, 1949 2 SHEETS—SHEET 2

INVENTOR,
Leonardo Jose Vidal
BY Ivan P. Tashof,
ATTORNEY

Patented Dec. 25, 1951

2,580,141

UNITED STATES PATENT OFFICE 2,580,141

PORTABLE BOOK-RECORD HOLDER

Leonardo José Vidal, Buenos Aires, Argentina

Application September 30, 1949, Serial No. 118,751
In Argentina August 6, 1949

2 Claims. (Cl. 206—47)

This invention relates to a hand book and phonograph record holder, and more particularly to a portable case wherein the different compartments are combined with front access means so as to form a novel and useful unit.

Devices having pockets for holding a certain number of phonograph records are extensively used in connection with complete works or selections of a given author, but this has only been done in the form af albums, wherein each sheet is constituted by an envelope adapted to receive a corresponding record. This means that such devices are not adapted to hold other elements besides phonograph records, as in the case of record holding cabinets which are capable of housing other articles besides phonograms.

Inasmuch as it would be useful to add literary material to record holding cases, an ideal solution would be a hand case comprising in a single body not only the record-holding pockets but also at least one book holder for a text of interest to the user of the portable device.

This is precisely what is afforded by the device of this invention, which is therefore referred to as a hand book-record holder.

While the provision of such unit would appear to be a simple matter, several difficulties are found in connection with the practical handling of the device. In effect, if everything is assembled in a single block and if it is desired to remove the records and the book by the same front, it is found difficult to grasp one of the articles contained while the others are present.

As a first measure, the removal front of the device was notched so as to give access to the phonograph records, but while this disclosed the cover for the action of the fingers, inasmuch as the book should occupy the same plane corresponding to said removal front, the body thereof will prevent the action of the fingers from the inner side, while the presence of the records also constitutes an obstacle for the ready removal of the book.

This drawback was overcome by adding a second notch in a portion which is not reached by the record due to its circular shape, i. e., that this notch through the covers and inner walls of the respective record-holding pockets is intended exclusively for the removal of the book. Inasmuch as it would not be practical to have to remove the book each time it is desired to take out a record for its reproduction, the solution is afforded by a further notch located not in the body of the case but in the border of the book itself, in line with the finger notch for removing the records, thereby assuring permanent access thereto.

In order that the invention may be more clearly understood and readily carried into practice, a preferred embodiment thereof has been illustrated by way of example in the accompanying drawings, wherein.

Figure 3:
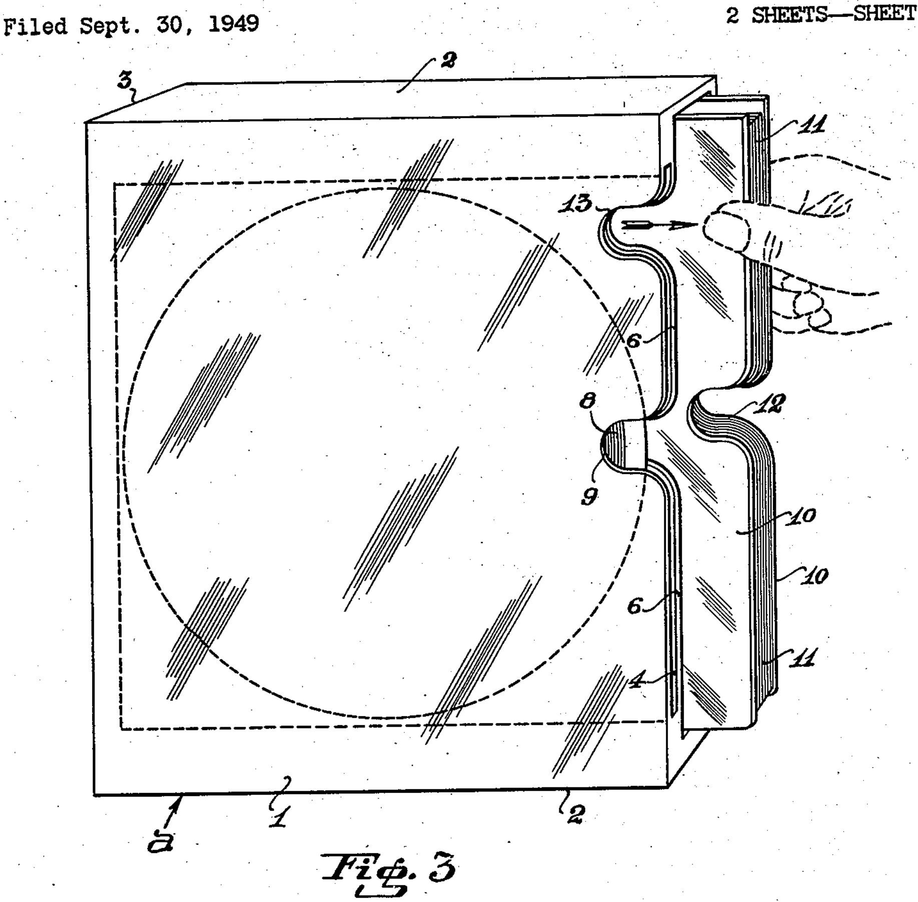
Figure 4:
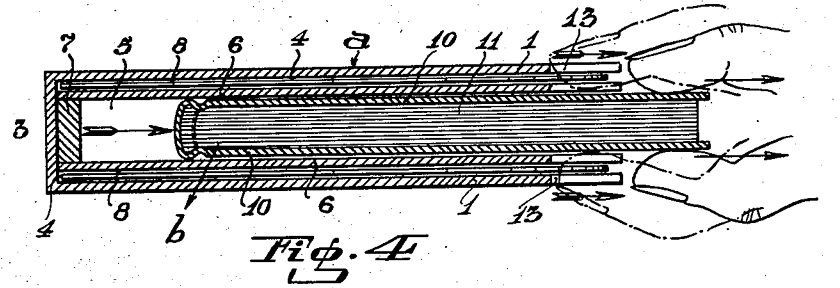

Fig. 3 is a perspective view of the holder, showing the manner in which the book may be withdrawn, by inserting the fingers in the corresponding notch, without altering the position of the records; and Fig. 4 is a cross-sectional view of the holder, taken at the level of the book-removing notch and showing the manner in which the fingers are first inserted in said notch so as to take the book and withdraw it as indicated by the arrow.

The same reference characters are used to indicate like or corresponding parts or elements throughout the drawings.

With reference to the drawings *a* indicates the body of the holder, which is a parallelepiped in the form of a flat box having two symmetrical covers 1, and the upper and lower edges 2 thereof form a straight dihedral angle with respect to the back 3, the front opposite said back 3 giving access to the three compartments in said holder.

These three compartments are constituted by a pair of phonogram holding pockets 4 and a book holder 6 therebetween, separated from said pockets by means of partitions 6. Thus, each of said pockets is formed by one of said partitions 6 and the respective cover 1, whereas the book holder 5 is bound by said partitions 6 and a rear block 7 reinforcing the back 3.

Each of said pockets 4 will house a phonograph record, whereas the book holder will house a book *b*. The box is so proportioned that the edges of book *b* will be flush with the front edges of the book holder 5, while the records 8, housed in the respective pockets 4, will also remain flush with the plane of the access front.

Figure 1:
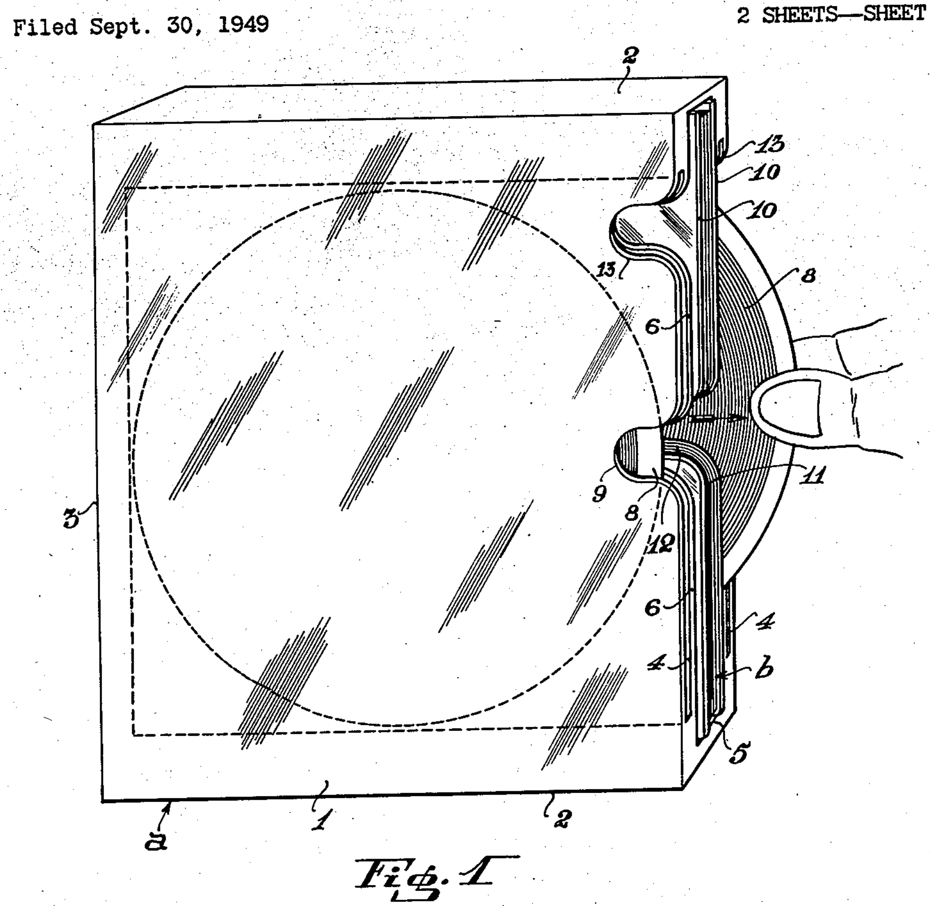
Fig. 1 is a perspective view of the holder at the time of removing one of the phonograph records, showing how the finger notch formed in the book gives access of the fingers to the record in either pocket.
Figure 2:
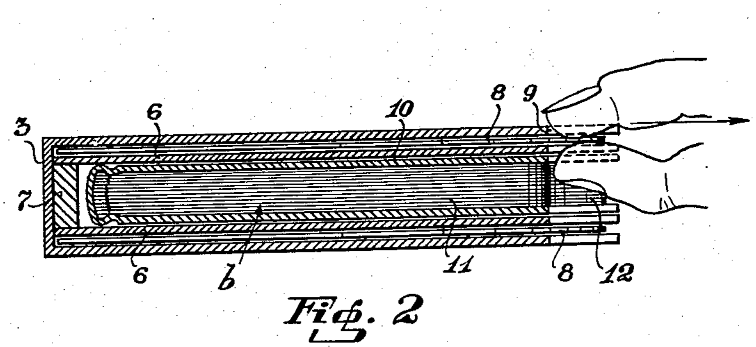
Fig. 2 is a cross-sectional view of the holder, showing the manner in which each phonograph record may be withdrawn individually by taking same with the fingers, as shown in dotted lines, due to the notch in the book registering with the notches on the borders of the record pockets.

Since the records could not be taken with the fingers, the covers 1 and partitions 6 are provided with a finger notch 9 located midway the access front, i. e., in the zone of maximum projection of the records 8, so as to disclose a portion of the records, large enough to take same. However, as the records cannot be taken with one finger, the book *b* is provided, both on the border of its covers 10 and of its leaves 11, with a finger notch 12 in line with the notches on said covers 1 and partitions 6. Thus, even with the book *b* in its holder 5, it will be possible to take the records 8 between the fingers, so that they may be easily withdrawn, as shown in Figs. 1 and 2.

In order that the book *b* may be readily taken between the fingers so as to withdraw same from its holder 5, a portion of both covers 10 thereof is disclosed by means of a double finger notch 13 not only on said covers 1 but also on the partitions 6. This double notch 13 is located in a zone not coinciding with the records 8 when the latter are positioned in their respective pockets, whereby when the book *b* is taken as shown in Figs. 3 and 4, the records 8 will remain in place without any change in their position.

Summarizing, the book-record holder of this invention constitutes a portable box for carrying records 8 and a book *b*, the former in respective pockets 4 and the latter in a compartment 5. Whenever it is desired to use the records, they can be easily taken out by taking them by the portions thereof disclosed by the notches 9 and 12, as shown in Figs. 1 and 2, while the book *b* may be withdrawn by taking same with the fingers through the notches 13 (Figs. 3 and 4).

It is evident that in carrying out the invention, several changes, modifications and/or alterations will occur to those skilled in the art, without departing from the scope of the invention as clearly set forth in the appended claims.

I claim:

1. A portable book-record holder which comprises a box-like member open at the front and divided by partitions into a book holding compartment and a plurality of phonograph record pockets, the latter being bound by said partitions and by the sides of said box-like member, a set of notches in said sides and said partitions in the zone of maximum projection of said records, a notch in a book housed in said compartment in line with said first mentioned notches, and a second set of notches in said sides and said partitions located outside of the zone occupied by the records when fully housed in said pockets.

2. A portable book-record holder comprising a container having a bottom member, a back member, and side members, said holder being open at the front thereof, a series of partitions in said holder spaced from one another to provide a plurality of record-receiving compartments, and a book-receiving compartment, the sides of said book-record holder and the partition members being provided adjacent their frontal edges with a first set of notches positioned in the zone of maximum projection of a record and adapted to facilitate record withdrawal, a second set of notches spacedly disposed above the first set of notches and adjacent said frontal edges, said second set of notches being outside of the zone occupied by the records, and a book housed in the book compartment of said holder and provided adjacent its exterior front edge with a notch in line with said first set of notches.

LEONARDO JOSÉ VIDAL.

REFERENCES CITED

The following references are of record in the file of this patent:

UNITED STATES PATENTS

| Number | Name | Date |
|---|---|---|
| 200,083 | Oviatt | Feb. 5, 1878 |
| 1,190,005 | Ralph | July 4, 1916 |
| 1,250,887 | Jerum | Dec. 18, 1917 |
| 1,887,300 | Goldstein | Nov. 8, 1932 |
| 1,921,414 | Lane et al. | Aug. 8, 1933 |